R. F. BASH.
WATER AND OIL PROOF HOUSING FOR TIMER WIRES.
APPLICATION FILED DEC. 5, 1919.
1,435,098.
Patented Nov. 7, 1922.
2 SHEETS—SHEET 1.
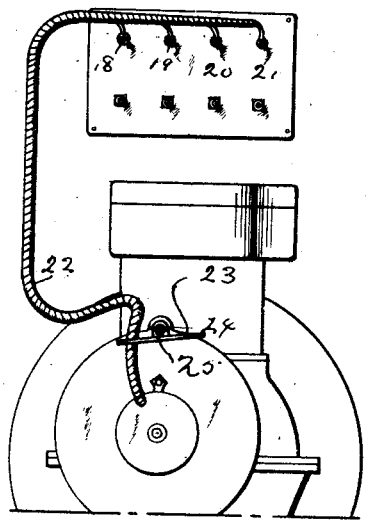
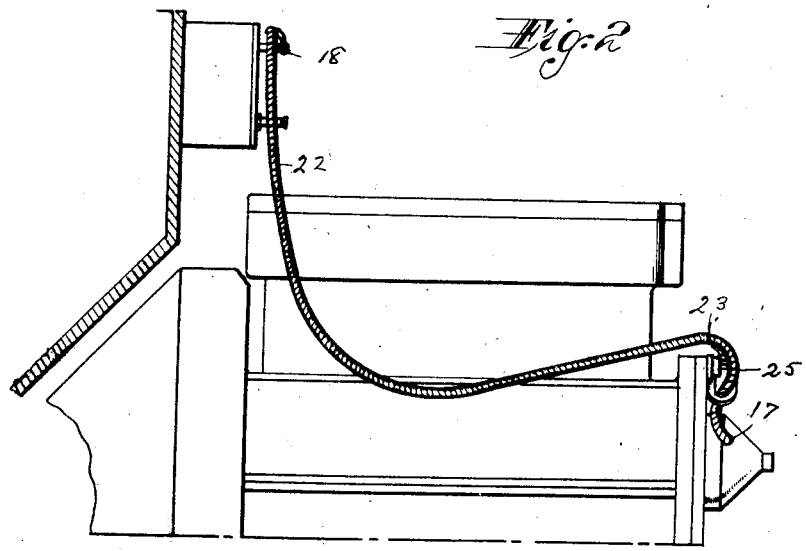
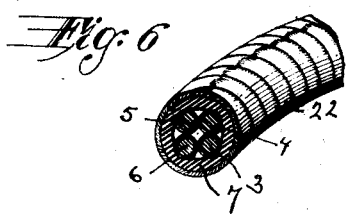
Inventor
Roy F. Bash R. F. BASH.
WATER AND OIL PROOF HOUSING FOR TIMER WIRES.
APPLICATION FILED DEC. 5, 1919.
1,435,098.
Patented Nov. 7, 1922.
2 SHEETS—SHEET 2.
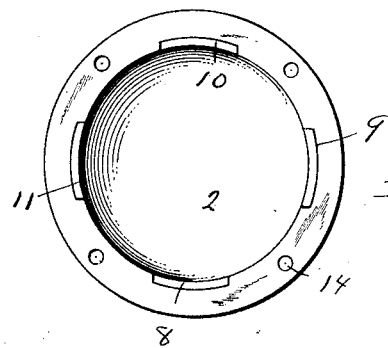
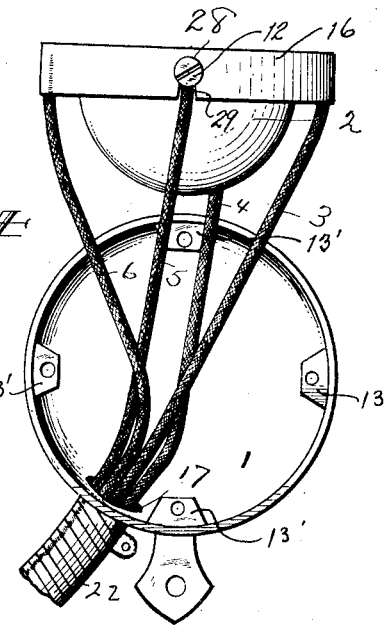
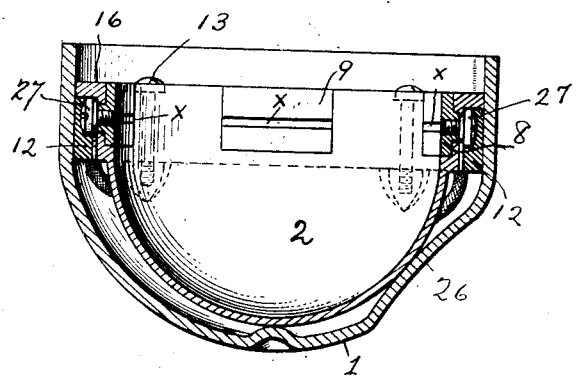
Inventor
Roy F. Bash
By Franklin H. Hough
Attorney Patented Nov. 7, 1922.

1,435,098

UNITED STATES PATENT OFFICE.

ROY F. BASH, OF FINDLAY, OHIO.

WATER AND OIL PROOF HOUSING FOR TIMER WIRES.

Application filed December 5, 1919. Serial No. 342,683.

*To all whom it may concern:*

Be it known that I, ROY F. BASH, a citizen of the United States, residing at Findlay, in the county of Hancock and State of Ohio, have invented certain new and useful Improvements in Water and Oil Proof Housings for Timer Wires; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in means for protecting ignition wires upon timers for engines and consists of a simple and efficient device of this nature having various details of construction, combination and arrangement of parts which will be hereinafter fully described, shown in the accompanying drawings and then specifically defined in the appended claim.

My invention is illustrated in the accompanying drawings which, with the numerals of reference marked thereon, form a part of this application, and in which:

Figure 1 is an end elevation of an engine showing the application of my invention thereto.

Figure 2 is a side elevation partly in section of the invention.

Figure 3 is an enlarged plan view showing the interior of the inside shell for protecting the wires.

Figure 4 is a detail of the two shell sections separated.

Figure 5 is a sectional view of the two shells connected together, and

Figure 6 is an enlarged detail perspective sectional view, showing the wires with their water-proof protecting covering.

Reference now being had to the details of the drawings by numerals:

1 and 2 designate shells made of any suitable material and which are adapted to be fitted together in the manner shown in Figure 5 of the drawings. The timing wires, designated respectively by numerals 3, 4, 5 and 6, which are covered with a suitable water-proof material 7, shown clearly in Figure 6 of the drawings, are fastened to the terminals 8, 9, 10 and 11 by means of countersunk screws 27 which are covered with a suitable oil and water-proof insulating cement 12. The terminals 8, 9, 10 and 11 are seated in the recesses 8', 9', 10' and 11', shown at Figure 3 and maintained in position by the same screws 27. It will be noted that the inner concaved faces of said terminals are provided with grooves X extending in a circumferential direction relative thereto and which are adapted to contain lubricant for the purpose of keeping the contact points from wearing and thereby producing a hotter spark.

Said shells are fastened together by means of screws which pass through the rib 16 and engage sockets 13', the interior of the shell 2 and other screws 27 engage the wires and hold the same in contact with the terminals.

It will also be understood that the insulating cement embedding the screws 27 and the extremities of the wires is such as to be water and oil proof, so that oil or dampness may not reach the wires, it being necessary to keep the latter from dampness from inside or outside exposure.

The outer shell 1 is provided with an opening 17, shown clearly in Figure 4 of the drawings, through which the several timing wires pass to the terminals 18, 19, 20 and 21, each shown clearly in Figure 1 of the drawings. The several wires are protected by the winding 22, preferably of metal, passed through the supporting loop 23, which has an eye 24 through which a bolt 25 passes, and which is held to the casting of the engine.

It will be noted upon reference to Figure 5 of the drawings that the outer shell 1 has an inwardly bent portion 26 which is so formed that the shell will not interfere with the belt which runs the fan of the engine.

By the provision of the means shown and described, it will be noted that the timing wires are thoroughly protected and insulated, and all outside connections are avoided.

What I claim to be new is:

A cap for a timer comprising double dome sections of substantially the same configuration, one of the sections within the other and spaced a slight distance therefrom, the sections affixed together, the inner section provided with segments adapted to be in the path of the timer rotor when the cap is in place and provided with an oil groove alined with the segments, the outer section adapted to fit over the end of the inner section and embrace the end of the timer casing, the space between the sections adapted to carry lead wires to the timer.

In testimony whereof I hereunto affix my signature.

ROY F. BASH.